US012581404B2

(12) United States Patent
Zhang et al.

(10) Patent No.: US 12,581,404 B2
(45) Date of Patent: Mar. 17, 2026

(54) AI-BASED MODEL USE FOR NETWORK ENERGY SAVINGS

(71) Applicant: Intel Corporation, Santa Clara, CA (US)

(72) Inventors: Yi Zhang, Portland, OR (US); Maruti Gupta Hyde, Portland, OR (US); Ziyi Li, Beijing (CN); Vaibhav Singh, New Delhi (IN); Christian Maciocco, Portland, OR (US); Jaemin Han, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 18/091,673

(22) Filed: Dec. 30, 2022

(65) Prior Publication Data

US 2023/0138190 A1 May 4, 2023

Related U.S. Application Data

(60) Provisional application No. 63/297,195, filed on Jan. 6, 2022.

(51) Int. Cl.
*H04W 52/02* (2009.01)
*H04W 36/24* (2009.01)
(52) U.S. Cl.
CPC ....... *H04W 52/0206* (2013.01); *H04W 36/24* (2013.01)
(58) Field of Classification Search
CPC ........................ H04W 52/0206; H04W 36/24
See application file for complete search history.

(56) References Cited

U.S. PATENT DOCUMENTS

| | | | | |
|---|---|---|---|---|
| 11,576,100 | B2 * | 2/2023 | Choi | H04W 36/302 |
| 2022/0416854 | A1 * | 12/2022 | Horn | H04W 24/10 |
| 2023/0006765 | A1 * | 1/2023 | Kutz | H04L 1/0033 |
| 2024/0224175 | A1 * | 7/2024 | Karaki | H04W 28/0221 |

OTHER PUBLICATIONS

Multilayer Network Optimization for 5G & 6G Alejandro Ramírez-Arroyo Received Oct. 17, 2020, accepted Oct. 31, 2020, date of publication Nov. 9, 2020, date of current version Nov. 19, 2020 (Year: 2020).*

* cited by examiner

*Primary Examiner* — Sujoy K Kundu
*Assistant Examiner* — Weibin Huang
(74) *Attorney, Agent, or Firm* — Schwegman Lundberg & Woessner, P.A.

(57) ABSTRACT

An apparatus and system of providing energy saving in a network are described. A target node receives, from a source node, a handover request to handover a UE due to at least one of entry of the source node into a power saving state or mobility optimization. In response, the target node transmits a relative energy efficiency value of Bits per Joule and periodic feedback related to a status of the UE for training an AI/ML energy saving model and stops the feedback in response to a stop parameter being met. The stop parameter is a first of: a predicted period of the source node to stay in the power saving state or time for a UE to connect to the target node, a percentage of UEs handed over that enter an idle or inactive state, and a percentage of UEs handed over that are further handed to another node.

20 Claims, 7 Drawing Sheets

AI-BASED MODEL USE FOR NETWORK ENERGY SAVINGS

PRIORITY CLAIM

This application claims the benefit of priority to U.S. Provisional Patent Application Ser. No. 63/297,195, filed Jan. 6, 2022, which is incorporated herein by reference in its entirety.

TECHNICAL FIELD

Embodiments pertain to 3GPP networks. In particular, some embodiments relate to mechanisms to promote energy saving in 3GPP networks.

BACKGROUND

The use and complexity of wireless systems has increased due to both an increase in the types of electronic devices using network resources as well as the amount of data and bandwidth being used by various applications, such as video streaming, operating on the electronic devices. As expected, a number of issues abound with the advent of any new technology, including complexities related to energy saving in networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
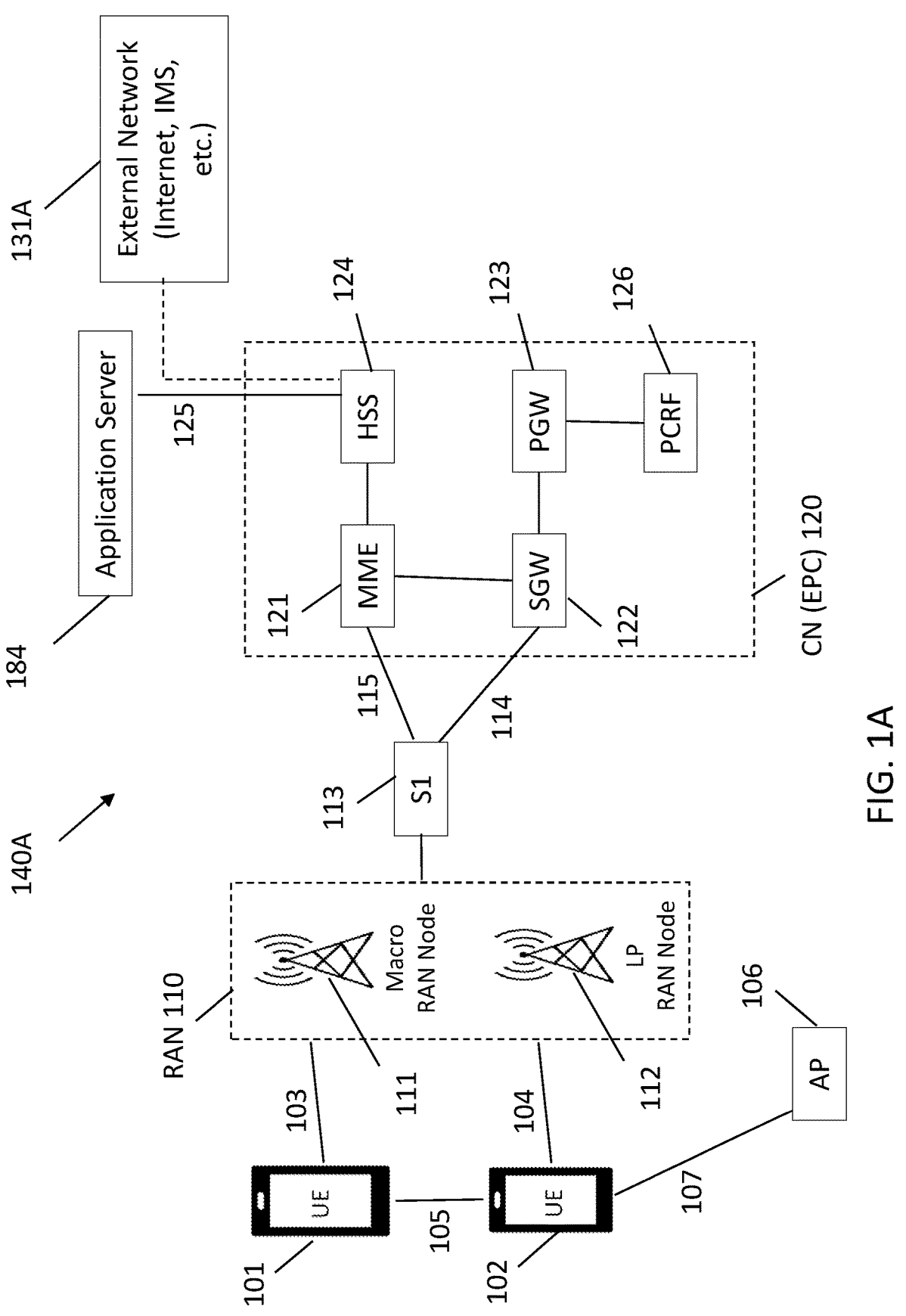
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions.

A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs—and thus may be alternately referred to as next generation NodeB (xNB).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and front-haul (F) F1 interface. The E1 interface may be between a CU control plane (gNB-CU-CP) and the CU user plane (gNB-CU-UP) and thus may support the exchange of signalling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signalling connection and UE-associated services that are related to a single UE and are associated with a UE-associated signalling connection that is maintained for the UE.

The F1 interface may be disposed between the CU and the DU. The CU may control the operation of the DU over the F1 interface. As the signalling in the gNB is split into control plane and user plane signalling, the F1 interface may be split into the F1-C interface for control plane signalling between the gNB-DU and the gNB-CU-CP, and the F1-U interface for user plane signalling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission-reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signalling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
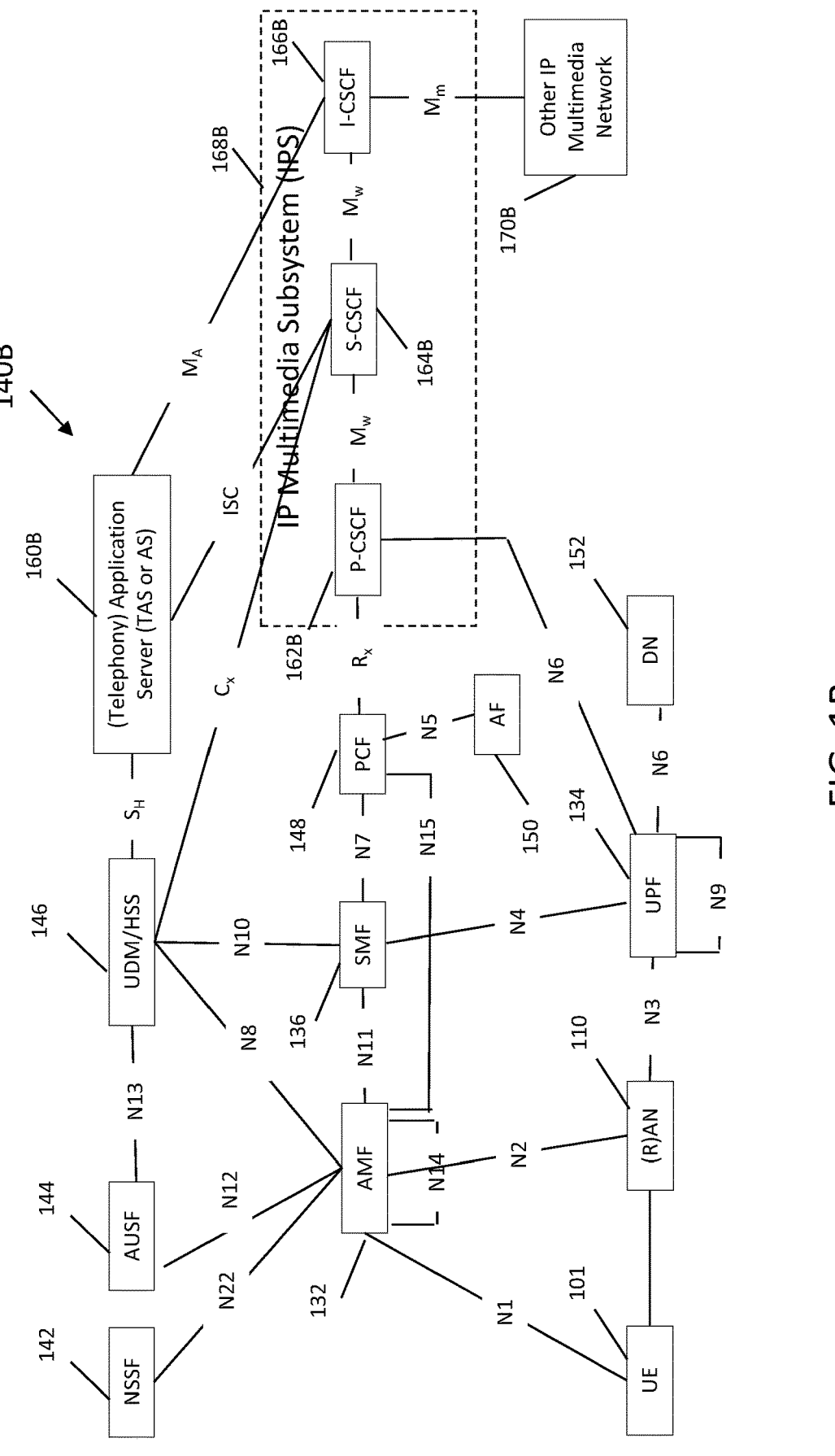
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
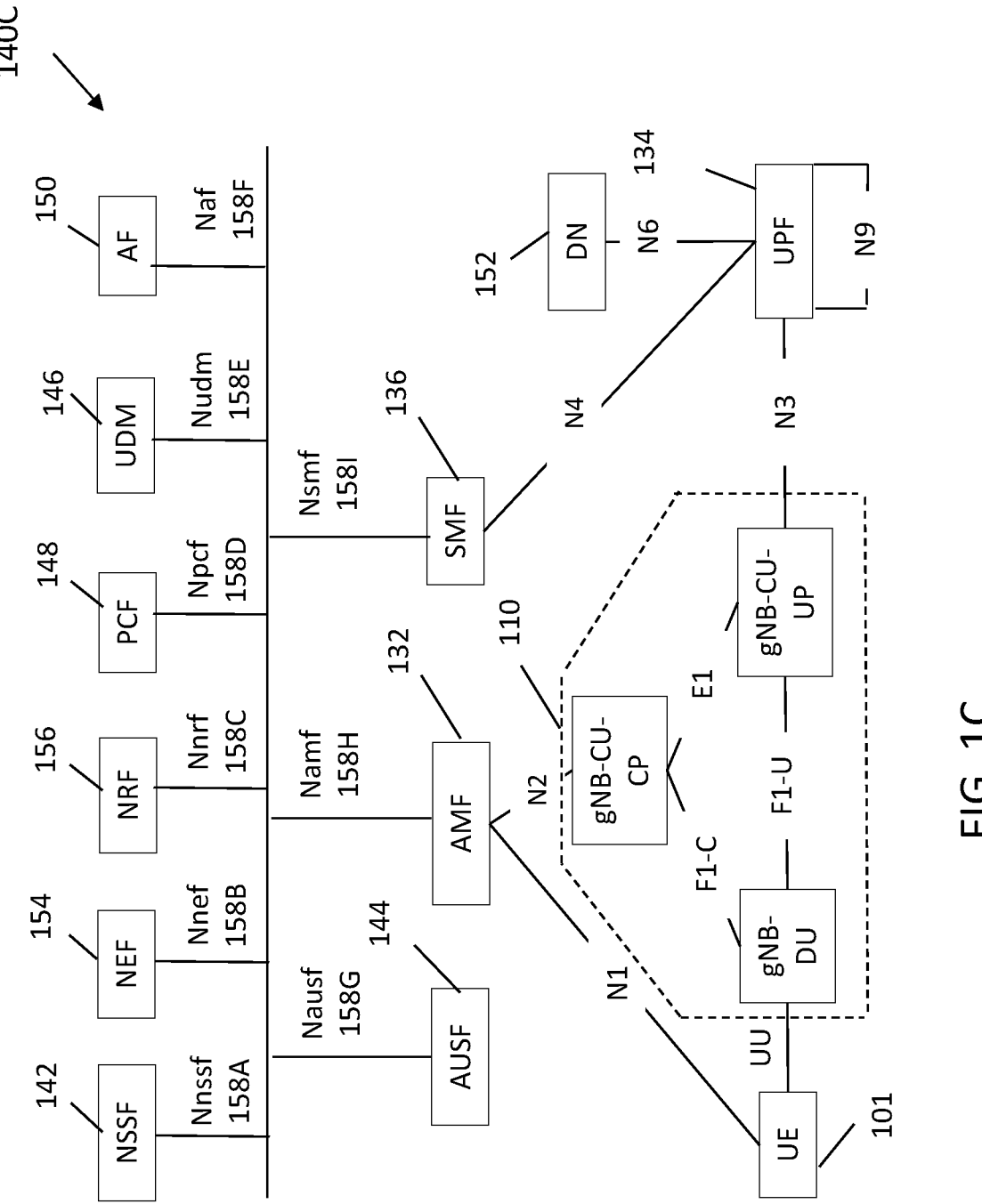
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
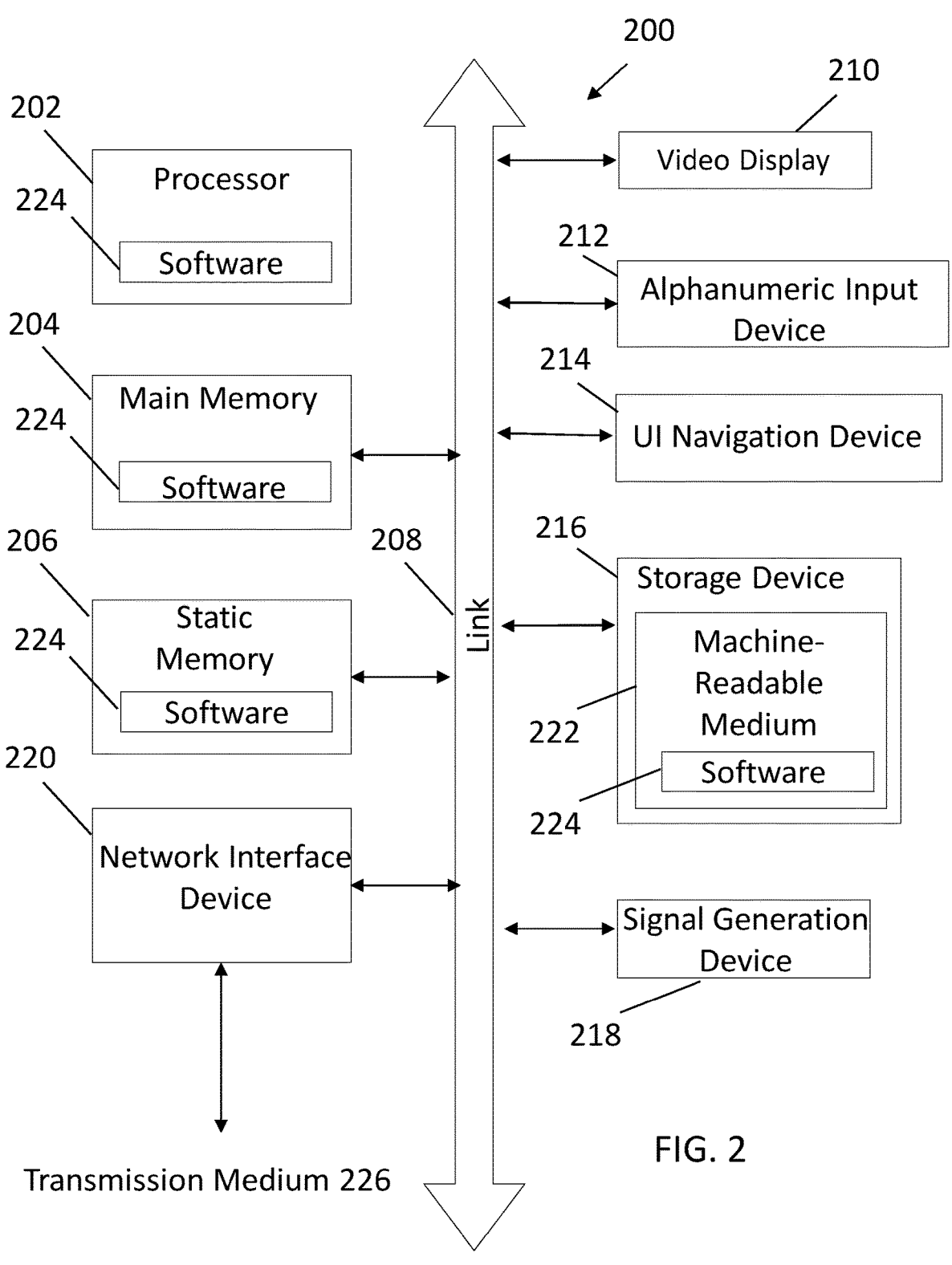
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9

11

12

(3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, energy savings is of continuing importance to network and device designers. One aspect of energy savings to be explored is the application of artificial intelligence (AI)/machine learning (ML) techniques in optimization of network energy savings at the system level. To make such energy saving strategy decisions, AI models may use various types of information to make optimization decisions.

In addition, while Cell Activation/Deactivation are the only power states currently available to the cell, 3GPP NR has defined a number of energy saving mechanisms on the network side other than Cell Activation/De-activation. Based on these mechanisms, a base station (BS), such as a gNB, can therefore be in a defined set of power saving states, with each power saving state having a different enabled/disabled functionality and thus a different set of available capabilities when in each of these states. While in these lower power saving states, the BS may not be deactivated, but the resource status and capacity to service UEs of the BS may be altered and thus must be communicated to the BS neighbors. There is no standardized way for BSs to communicate the power saving capabilities of the BS in a manner that is independent of specific hardware capabilities and instead is abstracted out to service capabilities such as average cell range, cell capacity, cell throughput, cell load, etc. which may be useful for the neighboring cells to make power saving decisions of their own.

Energy efficiency may be one input of an AI/ML-based Network Energy Saving model. Specifically, NG-RAN data Energy Efficiency (EE) may be defined as Data Volume (DV) divided by Energy Consumption (EC) of the considered network elements. The unit of this key performance indicator (KPI) is bit/J, which is assumed to be applied to AI/ML based energy saving use case. Given that the exact number of Bits per Joule may be proprietary, and vendors may be unwilling to share this information with other vendors, some embodiments herein describe using an additional indicator to indicate the relative energy efficiency value, which can be used when the actual bits/joule metric is not available.

In addition, feedback from a target NG-RAN node to a source NG-RAN node after handover occurs due to power saving or mobility optimization is basically an indication of whether the handover was the right decision or not and can be used for further ML model training. The feedback may be sent periodically from the target NG-RAN node to the source NG-RAN node. To avoid unnecessary feedback and save power further, the target NG-RAN can stop providing feedback to the source NG-RAN node if the UE is no longer at the target NG-RAN node, e.g., the UE has changed to IDLE/INACTIVE mode or even moved to another NG-RAN mode. However, currently the only case considered is when one UE is handed-over to the target NG-RAN. It remains to be determined what occurs if there are more than one handovers to the target NG-RAN but only some of those UEs go into IDLE/INACTIVE or another NG-RAN node. Further, a validity time for the corresponding energy saving strategy that is generated may be used as one of the outputs of the AI/ML-based energy saving model to indicate how long the feedback for the predicted energy saving strategy (for example, handover) is to continue based on predicted traffic status in future. The operations if the prediction validity timer expires but UEs are still in ACTIVE state are undecided at present, as is the timing when the target NG-RAN is to stop sending feedback.

Other options for power saving may rely on techniques that depend on vendor-specific hardware implementation and deployment, such as improved cell hardware, antenna muting, micro discontinuous transmission (DTX), adaptive sectorization. As mentioned above, however, the impact of these additional mechanisms has not been incorporated into the RAN energy savings solutions. This leads to very limited solutions that can only be applied under conditions such as when the cell experiences no load, such as at nighttime, but doesn't take advantage of low usage levels during the daytime low usage levels.

In addition, currently there is limited information exchanged between the RAN nodes and the OAM or among the RAN nodes themselves for training AI models. This may lead to poor outcomes, such as lower energy savings than are possible, loss of network coverage due to inaccurate AI model prediction.

Accordingly, aspects of various embodiments herein may include: 1) Input/output information for the AI models; 2) AI model accuracy data; 3) Periodic Feedback for further model training; 4) Energy Efficiency; and 5) criteria for stopping feedback for further model training.

1) Input/output information for the AI models: given that base stations have many possible mechanisms in addition to cell activation/deactivation to save energy, such mechanisms may impact the service capabilities of the base station and in turn affect the Energy Saving strategy and Handover strategies of the neighboring cells.

2) AI model accuracy data: mechanisms are described to ensure that the predicted information provided by various AI models is accompanied with metrics to allow the OAM/RAN nodes to know their accuracy and error bounds. This may allow the individual RAN nodes or OAM to make the best possible decisions under the prevailing conditions. Also, this may help to improve the existing AI models.

3) Periodic Feedback for further model training: the feedback from each RAN node may be set at a periodic interval in order to ensure that the RAN node is still able to maintain the KPIs for all the UEs at the chosen power saving strategy and ensure the resulting actions like HO strategy, are correctly selected by tracking the target NG-RAN node's feedback.

4) 'Energy Efficiency' as one of the Input information for the AI/ML-based network energy saving models. The definition of Energy Efficiency (Bits per Joule (BpJ)) might be applied to this use case. Given that the exact number of Bits per Joule may be a bit controversial to share between different vendors, using a relative Energy efficiency indicator such as low/Med/High' may yield more information. Energy efficiency is the energy used by a base station to process data (e.g., encode, decode, receive/transmit, etc. as indicated in TS 28.554, for example). Although only three categories are indicated, any number may be used—with the values set by base station implementation.

5) Embodiments describe the criteria of stopping feedback for further model training: the feedback from each RAN node is used to ensure the neighboring RAN node is still able to maintain the KPIs for all the UEs at the chosen power saving strategy (such as handover strategy). Embodiments describe when the target RAN nodes are to stop sending feedback in order to avoid unnecessary information exchange between nodes and to save power.

Various embodiments herein may provide information exchange to enable system energy savings AI/ML model work well, which is an important consideration for 5G and beyond 5G network deployment. Embodiments may enable power efficient platforms and systems solutions.

For network energy savings, a cell may have different levels of energy saving states and each energy saving state may correspond to different types of actions in the cell, depending on its capability and configuration. The actions may include, for example: increase the System Synchronization Block (SSB) periodicity, lower the advertised bandwidth (use Bandwidth Part Adaptation (BPA) feature), DTX for the BS, increase the System Information Block (SIB) periodicity, use wake-up signaling features/DRX features to increase the number of UEs and/or the amount of time spent in sleep mode, depending on UE traffic patterns, carrier aggregation turn on/off, secondary cell activation/deactivation, primary/Macro cell activation/deactivation, turn off dual connectivity, and turn off pico cells/small cells and just keep macro cells activated or vice versa.

For the first six mechanisms outlined (through carrier aggregation), the cell may not be deactivated, but some of its KPIs may be suitable for lower quality of service (QoS) applications. Thus, the decision to transfer a UE to another cell may be dependent on the following:

1) Whether the cell can still fulfill the application QoS for e.g., some highly latency-sensitive apps running on UEs within the cell at the chosen or proposed lower power saving state. This may be applicable for existing as well as any new UE entering the system. In this case, the output of the AI model may be to remain in low power state and transfer the UE to neighboring node. Thus, the decision to handover to another cell may still occur in this case.

For the actions in first six mechanisms to occur, basically the cell may advertise the impact of changing the power state on the KPIs for each energy state (e.g. current/predicted cell capacity, current/predicted avg. cell throughput, current/predicted resource availability, current/predicted # of UEs able to be handled, current/predicted average time for a UE to connect to the cell from idle state, current CQI information, current mobility information of UEs, predicted UE latency and predicted UE throughput, etc.) may or may not result in transfer a UE to another cell as the cell may still be providing service or may still do that in case the application running on the QoS is latency sensitive and is impacted by longer time to connect etc. For example, if a UE/UEs moves from RAN node 1 to RAN node 2, then the impact on QoS of the handed over/already existing UE/UEs in both RANI node 1 and node 2 should be taken into account while deciding the action to take for energy saving.

Figure 3:
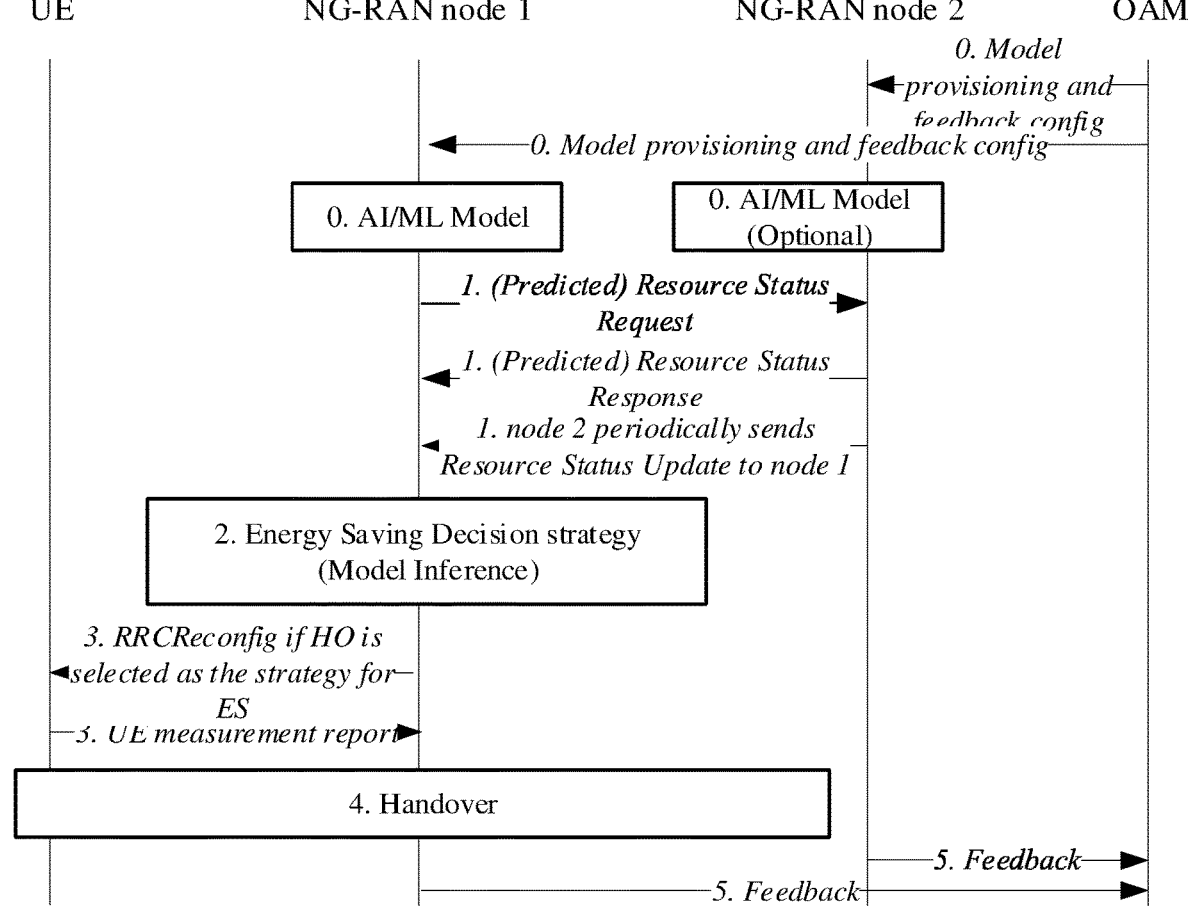
FIG. 3 illustrates a first power saving procedure in accordance with some embodiments.

FIG. 3 illustrates a first power saving procedure in accordance with some embodiments. FIG. 3 illustrates model training at the OAM and model inference at the NG-RAN. Thus, the cell in RAN node 1/2 (in FIG. 3) may communicate which level of energy saving state applies and also corresponding performance/KPI impact to the corresponding RAN node. The inter-node communication regarding this performance impact is missing presently.

For the remaining mechanisms (7-10), a cell may be entirely de-activated, so handover is more likely. But again, the node may share information as specified in the above list. The cell may also communicate potential time to turn on (in case the load starts to rise) and a threshold value to enable this.

Procedures for Information Exchange, Model Training/Inference and Feedback

Figure 4:
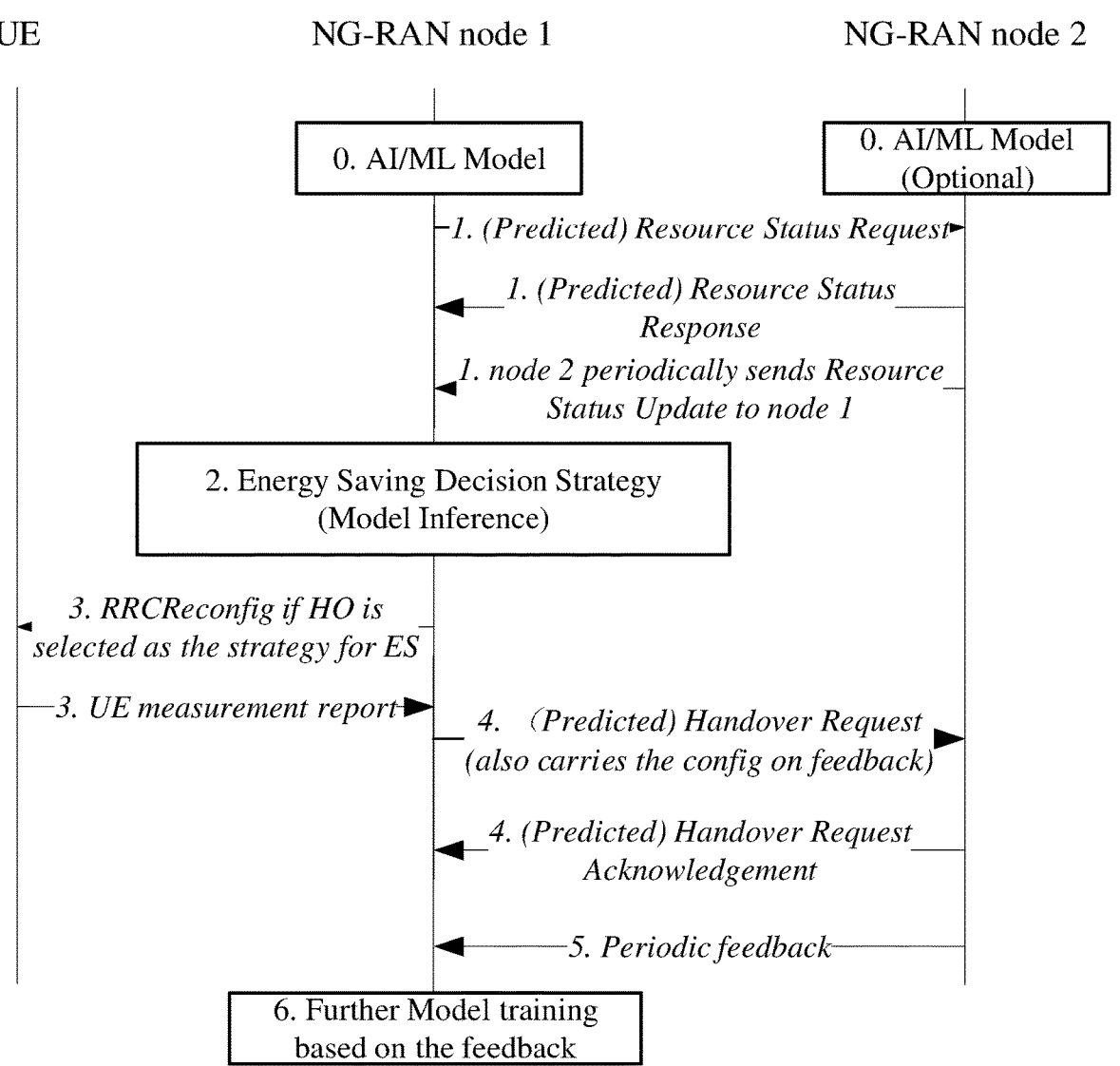
FIG. 4 illustrates a second power saving procedure in accordance with some embodiments.
Figure 5:
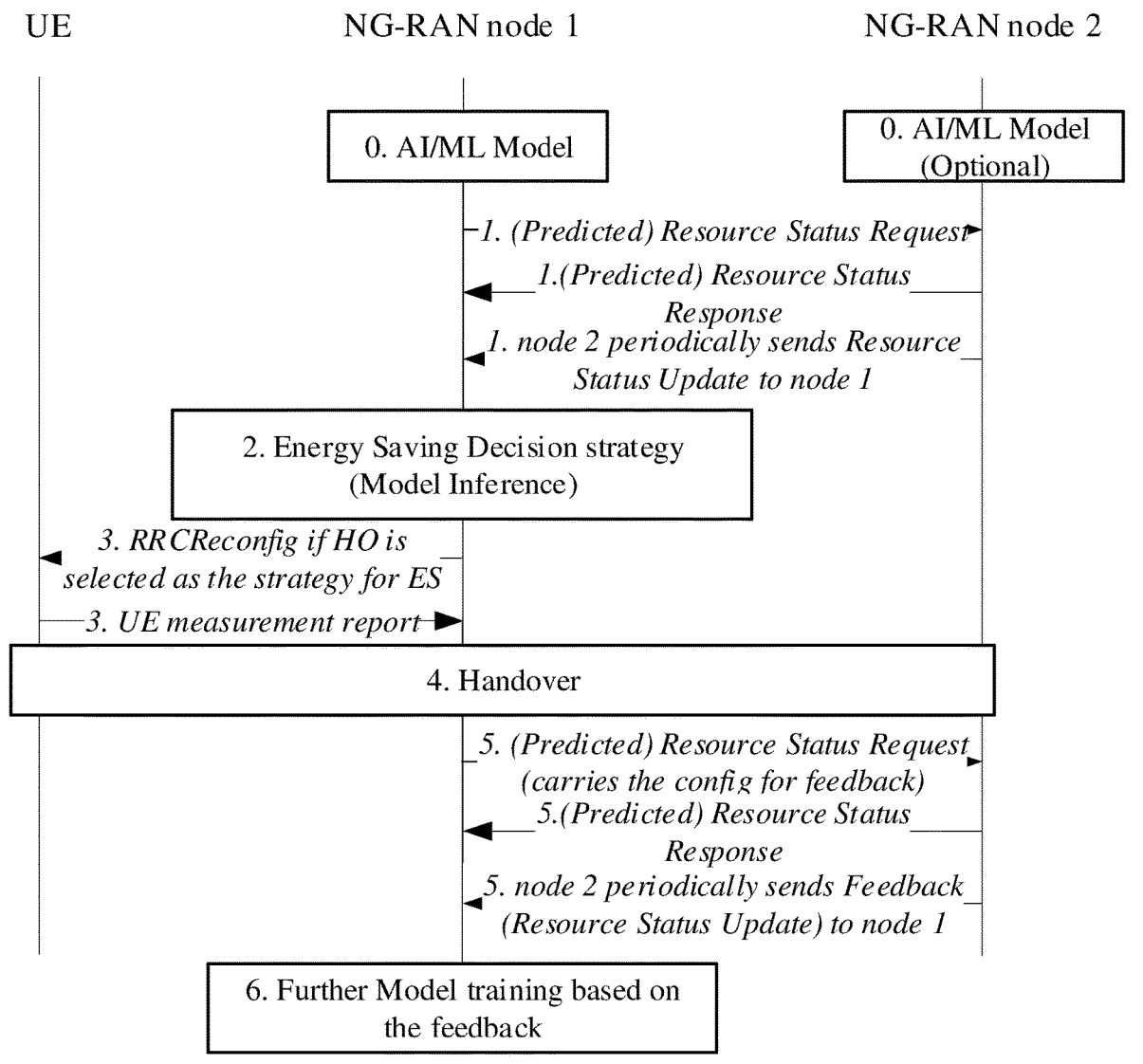
FIG. 5 illustrates a second power saving procedure in accordance with some embodiments.

In addition to model training at the OAM and model inference at the NG-RAN shown in FIG. 3, both model training and model inference may occur at the NG-RAN. FIG. 4 illustrates a second power saving procedure in accordance with some embodiments. FIG. 5 illustrates a second power saving procedure in accordance with some embodiments. In FIG. 4, both model training and model inference may occur at the NG-RAN, and feedback from Node 2 is configured during handover preparation. In FIG. 5, both model training and model inference may occur at the NG-RAN, and feedback configuration and reporting after handover may be provided through a Resource Status Request/Update message. The procedures shown in FIGS. 3-5 may also be applied to other use cases, like load balancing and mobility optimization.

Event-based Periodical feedback for ML model training: feedback may be used from the NG-RAN to the OAM or feedback from the target NG-RAN node to the source NG-RAN node after handover occurs due to power saving or mobility optimization. The feedback may be used for further ML model training. NG-RAN nodes may provide feedback to the OAM at a periodic interval to ensure that the OAM is still able to maintain the KPIs (e.g., average cell throughput) for all the UEs in coverage at the chosen power saving strategy (as shown in FIG. 3). Similarly, the target NG-RAN may provide periodical feedback to the source NG-RAN to ensure the handover strategy (e.g., how many UEs are to be handed over, to which node the UE is to be handed over, which UE are to be handed over, etc.) is correctly selected by the source NG-RAN node (as shown in FIGS. 4 and 5).

Different Ways to Set the Periodic Intervals for Feedback:

In FIG. 3 (model training at OAM and model interference at NG-RAN), the periodic interval may be set by OAM and configured to NG-RAN along with the ML model. The feedback may also be event-based depending on events specified by the OAM.

In FIG. 4 (both model training and model inference at NG-RAN), the periodic interval may be set by the source NG-RAN node and sent to the target NG-RAN node during the handover preparation.

The impact to the target NG-RAN node is due to UE handover so sending feedback from the target node to the source node may be avoided after the UE enters the idle mode or is further handed over to another node. Because the source NG-RAN may not know when the handover UE is to enter the idle mode or is again handed over, a feedback stop trigger may be set to stop the feedback from the target NG-RAN node. The feedback stop trigger may be, for example "stop feedback after the handover UE goes to idle state" or "stop feedback after the handover UE is handed over to a 3$^{rd}$ node". An example below shows how new IEs are added in the HANDOVER REQUEST to support periodic feedback for ML model training.

Handover Request

| IE/Group Name | Presence | Range | IE type and reference | Semantics description | Criticality |
|---|---|---|---|---|---|
| . . . | . . . | | . . . | | |
| Periodic Feedback for model training | O | | 9.2.3.x | Present when the source node asks for feedback to improve the ML training | — |
| > Report Characteristics | O | | BITSTRING (SIZE(32)) | Each position in the bitmap indicates measurement object the target NG-RAN node is requested to report. First Bit = PRB Second Bit = TNL Capacity Ind Third Bit = Composite Available Capacity Fourth Bit = Number of Active UEs, Fifth Bit = RRC connections. Sixth Bit = Avg. Cell Throughput Other bits shall be ignored | — |
| > Feedback Periodicity | O | ENUMERATED(500 ms, 1000 ms, 2000 ms, 5000 ms, 10000ms, . . . 1 min, 5 min, 10 min)) | | Periodicity that can be used for reporting of current cell capacity, cell throughput, and current resource availability. If this IE does not present it means it is one time feedback | |
| >Feedback stop trigger | O | ENUMERATED (specific time duration, UE goes to idle, UE HO to 3rd cell, . . . | | It is presentonly when Feedback Periodicity is present. | |
| >Feedback duration | O | | ENUMERATED(10 s, 100 s, . . . | Present when Feedback stop triggering for ML training is set as "specific time duration" | |

In FIG. 5 (both model training and model inference at NG-RAN), the periodic interval may be set by the source NG-RAN node and sent to the target NG-RAN node through a RESOURCE STATUS REQUEST. An example below shows how the RESOURCE STATUS REQUEST may be expanded to support feedback for ML model training.

Resource Status Request

| IE/Group Name | Presence | Range | IE type and reference | Semantics description | Criticality | Assigned Criticality |
|---|---|---|---|---|---|---|
| Message Type | M | | 9.2.3.1 | | YES | reject |
| NG-RAN node1 Measurement ID | M | | INTEGER (1 . . . 4095, . . . ) | Allocated by NG-RAN node1 | YES | reject |
| NG-RAN node2 Measurement ID | C-ifRegistrationRequestStoporAdd | | INTEGER (1 . . . 4095, . . . ) | Allocated by NG-RAN node2 | YES | ignore |
| Registration Request | M | | ENUMERATED (start, stop, add, . . . ) | Type of request for which the resource status is required. | YES | reject |
| Report Characteristics | C-ifRegistrationRequestStart | | BITSTRING (SIZE(32)) | Each position in the bitmap indicates measurement object the NG-RAN node2 is requested to report. First Bit = PRB Periodic, Second Bit = TNL Capacity Ind Periodic, Third Bit = Composite Available Capacity Periodic, Fourth Bit = Number of Active UEs, Fifth Bit = RRC connections. Sixth Bit = Avg. Cell Throughput Seventh Bit = Predicted avg. throughput over Interval X Eighth Bit = Confidence level of predicted information Ninth Bit = Avg. time for UE to connect to cell $10^{th}$ Bit = Quantized Histogram of AI/model error Other bits shall be ignored by the NG-RAN node2. | YES | reject |
| . . . | . . . | | | | | |
| . . . | . . . | | | | | |
| Reporting Periodicity | O | | ENUMERATED (500 ms, 1000 ms, 2000 ms, 5000 ms, 10000 ms, . . . 1 min, 5 min, 10 min) | Periodicity that can be used for reporting of PRB Periodic, TNL Capacity Ind Periodic, Composite Available Capacity Periodic. Also used as the averaging window length for all measurement object if supported. | YES | Ignore |
| Prediction Interval | O | | ENUMERATED (5 min, 10 min, 30 min, 60 min . . . ) | If the Seventh and Eighth bit is present, then this IE indicates the interval over which the prediction has been made | YES | Ignore |
| Confidence Level of the Prediction | O | | ENUMERATED (0, 100) | If the Seventh and Ninth bit is present, then this IE indicates the confidence level of the predicted info | | |
| Quantized Histogram of AI/model error | O | | ENUMERATED (0-10%, 10-20% . . . 90-100%) | If the Seventh and $10^{th}$ bit is present, then this IE indicates the distribution of the AI/model error | | |

-continued

| IE/Group Name | Presence | Range | IE type and reference | Semantics description | Criticality | Assigned Criticality |
|---|---|---|---|---|---|---|
| Avg. time for UE to connect to cell | O | | ENUMERATED (20 ms, 40 ms, 60 ms, 80 ms, 100 ms, 120 ms, 160 ms, 200 ms) | If the Ninth bit is present, then this IE indicates the average amount of time it takes a UE to be able to connect to the cell | | |
| Feedback stop trigger for ML training | O | | ENUMERATED (specific time duration, UE goes to idle, UE HO to 3rd cell, . . . | It is present only when Reporting Periodicity is present. | | |
| >Feedback duration | O | | ENUMERATED (10 s, 100 s, . . . | Present when Feedback stop triggering for ML training is set as "specific time duration" | | |
| >UE INFO | O | | | Present when Feedback stop triggering for ML training is set as "UE goes to idle" or "UE HO to 3rd cell" | | |

Corresponding the Resource Status Request message, the Resource Status Update message will also be updated to reflect the measurements for the requested additional parameters as shown below:

Resource Status Update

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| NG-RAN node1 Measurement ID | M | | INTEGER (1 . . . 4095, . . . ) | Allocated by NG-RAN node1 | YES | reject |
| NG-RAN node2 Measurement ID | M | | INTEGER (1 . . . 4095, . . . ) | Allocated by NG-RAN node2 | YES | reject |
| Cell Measurement Result | | 1 | | | YES | ignore |
| >Cell Measurement Result Item | | 1 . . . < maxnoofCellsinNG-RANnode > | | | YES | ignore |
| >>Cell ID | M | | Global NG-RAN Cell Identity 9.2.2.27 | | — | |
| >>Radio Resource Status | O | | | | — | |
| >>TNL Capacity Indicator | O | | | | — | |
| >>Composite Available Capacity Group | O | | | | — | |
| >>Slice Available Capacity | O | | | | — | |
| >>Number of Active UEs | O | | | | — | |
| >> RRC Connections | O | | | | — | |
| >>Predicted avg. throughput over Interval X | | | | | | |
| >>Prediction Interval | O | | | | | |
| >>Confidence Level of the Prediction | O | | | | | |
| >>Quantized Histogram of | O | | | | | |

-continued

| IE/Group Name | Presence | Range | IE type and reference | Semantics description | Criticality | Assigned Criticality |
|---|---|---|---|---|---|---|
| AI/model error |  |  |  |  |  |  |
| >>Avg. time for UE to connect to cell | O |  |  |  |  |  |
| >>Avg. Cell Throughput |  |  |  |  |  |  |
| >>UE INFO | O |  |  |  |  |  |

Prediction interval denotes the confidence interval of the predicted value from RAN node 1/2. Confidence level of the prediction is critical information as well, as it denotes the percentage confidence that the prediction provided by RAN node-1/2 is correct. The confidence level may incorporate the average error in the prediction as well. A minimum confidence level threshold can be included in the information as well. A quantized histogram of error provides further details on the AI modeling error and may be useful for further AI model training.

"UE INFO" indicates the UE that is handed over from the source NG-RAN node to the target NG-RAN node due to power saving. "NG-C UE associated Signaling reference" or other information may be used to identify the specific UE that has been handed over to the target NG-RAN.

| >NG-C UE associated Signalling reference | M | AMF UE NGAP ID 9.2.3.26 | Allocated at the AMF on the source NG-C connection. |
|---|---|---|---|

In other embodiments, new messages may be defined instead of expanding the existing messages:

Instead of expanding the existing HANDOVER REQUEST and RESOURCE STATUS REQUEST/RESOURCE STATUS RESPONSE/RESOURCE STATUS UPDATE, an alternative way is to define new messages, e.g., Predicted Handover Request/Predicted Handover Request Acknowledgement and Predicted Resource Status Request/Predicted Resource Status Response/Predicted Resource Status Update specially for information exchange for ML model training and ML-based power saving and mobility optimization triggered handover with the same information as outlined in the above table.

Content of the Feedback:

The content of the feedback can be related to the UE handover decisions and corresponding success/failure, current cell capacity, current average cell throughput, current resource availability, actual energy saving observed once the energy saving decision is taken. The feedback may also include error statistics as observed in the different AI/ML models. The statistics may include the CDF/histogram of the observed error in the AI/ML models. The feedback can be used for further training of the model, either locally at the NG-RAN or at the OAM to better predict the success/failure of the ML model output.

Exchanged Energy Efficiency Between NG-RAN Nodes

Although 'Bits per Joule' is defined to stand for the energy efficiency of the current NG-RAN node and may be applied to AI/ML-based energy saving model, the exact value of 'Bits per Joule' may be proprietary and the vendors may be unwilling to share this information with other vendors. Accordingly, a range of 'Bits per Joule' may be used as an additional indicator, e.g., 'Low/Med/High', to indicate the relative energy efficiency value of Bits per Joule when the actual bits/joule metric is not available or not willing to be shared.

In addition, 'Energy Status' indicating the current energy consumption status, e.g., Low, Medium, High, may be exchanged between NG-RAN nodes along with energy efficiency. Energy efficiency may merely provide the relation between the useful output and energy/power consumption, but may be unable to provide a full picture of how much the energy consumption is. If the system is consuming high energy despite low cell traffic load, then it can be better understood why energy efficiency is low. If the system is consuming high energy due to a large amount of traffic, then a fuller picture of why the energy consumption is high may be obtained. In a cloud native environment in which multiple cells are physically deployed on the same platform, 'Energy Status' may be used to indicate the energy consumption status per cell.

In addition, 'Energy Saving Strategy Effectiveness/Usefulness' can be exchanged between NG-RAN nodes as a feedback from the neighboring NG-RAN nodes to the source NG-RAN node. One purpose of AI/ML-based energy saving is to allow the system dynamically to configure energy-saving strategy and to keep system performance as well as reducing energy consumption. An AI/ML-based energy saving strategy from one NG-RAN node (e.g., moving some UEs to another NG-RAN nodes) at a certain time may affect the energy efficiency of cells in the neighboring NG-RAN nodes. The strategy may be effective toward one neighboring node (by not degrading energy efficiency or not degrading the performance of the handover UE) but it could be also ineffective toward another neighboring node. The performance feedback for one NG-RAN node's AI/ML decision from neighboring nodes can not only improve AI/ML model locally but also collectively improve the system performance. NG-RAN nodes may exchange exact values of 'Energy Saving Strategy Effectiveness/Usefulness' or bucket values into a 'Low/Medium/High' value and exchange this range value.

Criteria of Stopping Feedback from Neighbor NG-RAN Node for AI/ML Model Training Feedback from the NG-RAN to the OAM or feedback from the target NG-RAN node to the source NG-RAN node after handover occurs due to power saving or mobility optimization may be used for further ML model training. The feedback could be sent periodically from the target NG-RAN node to the source NG-RAN node. To avoid unnecessary feedback and save power further, the target NG-RAN node may stop providing feedback to the source NG-RAN node. There may be multiple handovers to the target NG-RAN as the output of AI/ML-based energy saving use case. A validity time for the corresponding energy saving strategy, like handover, may also be provided by the source NG-RAN to indicate the predicted time/period of the source NG-RAN node to stay in the new energy state and/or the predicted time/period for a UE to connect to a target NG-RAN node.

If the prediction validity timer expires, the confidence level on the prediction decreases. Continuing feedback may be unable to help much to improve the AI/ML model at the REQUEST may include the new content described above, as well as additional information as shown below. In other embodiments, other messages may be used during handover to include the periodicity and feedback stop timing and/or UE percentages above.

Handover Request

| IE/Group Name | Presence | Range | IE type and reference | Semantics description | Criticality | Assigned Criticality |
|---|---|---|---|---|---|---|
| . . . | . . . | | . . . | | | |
| > Feedback Periodicity | O | ENUMERATED (500 ms, 1000 ms, 2000 ms, 5000 ms, 10000 ms, . . . 1 min, 5 min, 10 min)) | | Periodicity that can be used for reporting of current cell capacity, cell throughput, and current resource availability. If this IE does not present it means it is one time feedback | | |
| >Feedback stop trigger | O | ENUMERATED (specific time duration, Specified sample percentage of UEs go into Idle/Inactive state, Specified sample percentage of UEs are HO to another cell, Any of the above . . . | | It is present only when Feedback Periodicity is present. 'specific time duration' could be set as the value of validity time of prediction. 'Any of the above' refers to target NG-RAN node stops feedback when either specific time duration expires or a specified percentage of UEs which HO to this target NG-RAN node go to idle/inactive state or HO to a 3rd NG-RAN node, no matter which one satisfies first. | | |
| > Feedback sample UE percentage | O | 0~100 | | It is present only when Feedback stop trigger is set to 'Sample percentage of UEs go to idle/inactive', or 'Sample percentage of UEs are HO to $3^{rd}$ cell' or 'Any of the above' | | | source NG-RAN node but can consume more power and resource on sending/receiving feedback at source/target NG-RAN nodes. Therefore, the target NG-RAN node may stop sending feedback if the validity timer expires no matter how many handover UEs are still active in the target NG-RAN node.

The source NG-RAN node may share a Feedback Sample UE Percentage (for example 80%) with the target NG-RAN indicating that the target NG-RAN node may stop sending feedback if 80% handed over UEs enter the IDLE/INAC-TIVE mode or handed over again to a $3^{rd}$ NG-RAN node if the validity timer is still on. If the Feedback Sample UE Percentage is 100%, the target NG-RAN may stop sending feedback when all UEs have been handed over to this target NG-RAN node enter the Idle/Inactive state or are again handed over to another NG-RAN node.

Accordingly, other AI model outputs may include the validity time and percentages described herein. The target NG-RAN node may stop feedback when either the validity timer expires or a specified percentage of UEs that have been handed over to the target NG-RAN enter the idle/inactive state or are handed over to a 3rd NG-RAN node, depending on which condition is the first to be satisfied.

One example implementation of the HANDOVER REQUEST message is shown as below. The HANDOVER Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a target next generation radio access network (NG-RAN) node, the apparatus comprising: memory; and processing circuitry, to configure the target NG-RAN node to:

receive, from a source NG-RAN node, a range of bits per joule (BpJ) that indicates a current energy consumption status of the source NG-RAN node, the range of BpJ having a predetermined number of categories; and transmit the range of BpJ as an input to an artificial intelligence (AI)/machine learning (ML) energy saving model for training to determine whether handover of at least one user equipment (UE) is to be performed between the source NG-RAN node and the target NG-RAN node, wherein the memory is configured to store the range of BpJ.

2. The apparatus of claim 1, wherein the categories include low, medium, and high energy consumption.

3. The apparatus of claim 1, wherein the processing circuitry configures the target NG-RAN node to:

receive a value of the BpJ from the source NG-RAN node, and provide the value of the BpJ as another input to the AI/ML model.

4. The apparatus of claim 1, wherein the processing circuitry configures the target NG-RAN node to:

receive, from the source NG-RAN node, a source Energy Saving Strategy Effectiveness/Usefulness value that indicates a level of effectiveness or usefulness a source energy saving strategy is at the source NG-RAN node, transmit the source Energy Saving Strategy Effectiveness/Usefulness value as another input to the AI/ML model, and transmit, to the source NG-RAN node, a target Energy Saving Strategy Effectiveness/Usefulness value that indicates a level of effectiveness or usefulness a target energy saving strategy is at the target NG-RAN node.

5. The apparatus of claim 1, wherein the processing circuitry configures the target NG-RAN node to:

determine whether handover of the at least one UE has occurred between the source NG-RAN node and the target NG-RAN node due to at least one of entry of the source NG-RAN node into a power saving state or mobility optimization, and transmit periodic feedback to the source NG-RAN node for training of an AI/ML model that occurs at the source NG-RAN in response to a determination that handover of the at least one UE has occurred between the source NG-RAN node and the target NG-RAN node due to the at least one of entry of the source NG-RAN node into a power saving state or mobility optimization.

6. The apparatus of claim 5, wherein the processing circuitry configures the target NG-RAN node to:

receive, from the source NG-RAN node, at least one feedback stop parameter, determine whether the feedback stop parameter has been met, and in response to a determination that the feedback stop parameter has been met, stop transmission of the periodic feedback.

7. The apparatus of claim 6, wherein the at least one feedback stop parameter is a predicted period of the source NG-RAN node to stay in the power saving state.

8. The apparatus of claim 6, wherein the at least one feedback stop parameter is a predicted time for a UE to connect to the target NG-RAN node.

9. The apparatus of claim 6, wherein the at least one feedback stop parameter is a predetermined percentage of UEs handed over to the target NG-RAN node that enter an idle or inactive state.

10. The apparatus of claim 6, wherein the at least one feedback stop parameter is a predetermined percentage of UEs handed over to the target NG-RAN node that are handed over from the target NG-RAN node to another NG-RAN node different from the source NG-RAN node.

11. The apparatus of claim 10, wherein the predetermined percentage of UEs are handed over from the source NG-RAN node to the target NG-RAN node.

12. The apparatus of claim 6, wherein the at least one feedback stop parameter is a first of:

a predicted period of the source NG-RAN node to stay in the power saving state, a predicted time for a UE to connect to the target NG-RAN node, a predetermined percentage of UEs handed over to the target NG-RAN node that enter an idle or inactive state, and a predetermined percentage of UEs handed over to the target NG-RAN node that are handed over from the target NG-RAN node to another NG-RAN node different from the source NG-RAN node.

13. The apparatus of claim 6, wherein:

the at least one feedback stop parameter includes at least one of a predicted period of the source NG-RAN node to stay in the power saving state or a predicted time for a UE to connect to the target NG-RAN node, and the target NG-RAN node is configured to stop transmission of the periodic feedback independent of a number of UEs are in an active mode in the target NG-RAN node.

14. The apparatus of claim 6, wherein the processing circuitry configures the target NG-RAN node to receive the at least one feedback stop parameter during handover preparation.

15. The apparatus of claim 14, wherein the processing circuitry configures the target NG-RAN node to receive a handover request message that includes periodicity of the feedback and the at least one feedback stop parameter.

16. A non-transitory computer-readable storage medium that stores instructions for execution by one or more processors of a target next generation radio access network (NG-RAN) node, the one or more processors to configure the target NG-RAN node to, when the instructions are executed:

receive, from a source NG-RAN node, a range of bits per joule (BpJ) that indicates a current energy consumption status of the source NG-RAN node, the range of BpJ having a predetermined number of categories; and transmit the range of BpJ as an input to an artificial intelligence (AI)/machine learning (ML) energy saving model for training to determine whether handover of at least one user equipment (UE) is to be performed between the source NG-RAN node and the target NG-RAN node.

17. The non-transitory computer-readable storage medium of claim 16, wherein the one or more processors configure the target NG-RAN node to, when the instructions are executed:

receive, from the source NG-RAN node, a source Energy Saving Strategy Effectiveness/Usefulness value that indicates a level of effectiveness or usefulness a source energy saving strategy is at the source NG-RAN node, transmit the source Energy Saving Strategy Effectiveness/Usefulness value as another input to the AI/ML model, and transmit, to the source NG-RAN node, a target Energy Saving Strategy Effectiveness/Usefulness value that indicates a level of effectiveness or usefulness a target energy saving strategy is at the target NG-RAN node.

18. The non-transitory computer-readable storage medium of claim 16, wherein the one or more processors configure the target NG-RAN node to, when the instructions are executed:

determine whether handover of the at least one UE has occurred between the source NG-RAN node and the target NG-RAN node due to at least one of entry of the source NG-RAN node into a power saving state or mobility optimization, and transmit periodic feedback to the source NG-RAN node for training of an AI/ML model that occurs at the source NG-RAN in response to a determination that handover of the at least one UE has occurred between the source NG-RAN node and the target NG-RAN node due to the at least one of entry of the source NG-RAN node into a power saving state or mobility optimization.

19. The non-transitory computer-readable storage medium of claim 18, wherein the one or more processors configure the target NG-RAN node to, when the instructions are executed:

receive, from the source NG-RAN node, at least one feedback stop parameter, determine whether the feedback stop parameter has been met, and in response to a determination that the feedback stop parameter has been met, stop transmission of the periodic feedback.

20. The non-transitory computer-readable storage medium of claim 19, wherein the at least one feedback stop parameter is at least one of:

a predicted period of the source NG-RAN node to stay in the power saving state, a predicted time for a UE to connect to the target NG-RAN node, a predetermined percentage of UEs handed over to the target NG-RAN node that enter an idle or inactive state, and a predetermined percentage of UEs handed over to the target NG-RAN node that are handed over from the target NG-RAN node to another NG-RAN node different from the source NG-RAN node.

* * * * *